(12) United States Patent
Kohlstrung et al.

(10) Patent No.: US 9,637,067 B2
(45) Date of Patent: May 2, 2017

(54) THERMALLY EXPANDABLE FORMULATIONS

(71) Applicant: Henkel AG & Co. KGaA, Duesseldorf (DE)

(72) Inventors: Rainer Kohlstrung, Plankstadt (DE); Takehito Yamada, Heidelberg (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 28 days.

(21) Appl. No.: 14/711,958

(22) Filed: May 14, 2015

(65) Prior Publication Data

US 2015/0246646 A1 Sep. 3, 2015

Related U.S. Application Data

(63) Continuation of application No. PCT/EP2013/073537, filed on Nov. 12, 2013.

(30) Foreign Application Priority Data

Nov. 20, 2012 (DE) ........................ 10 2012 221 192

(51) Int. Cl.
| | |
|---|---|
| *F16J 15/02* | (2006.01) |
| *B60R 13/06* | (2006.01) |
| *B29C 44/18* | (2006.01) |
| *C08J 9/00* | (2006.01) |
| *C08J 9/10* | (2006.01) |
| *C08L 23/08* | (2006.01) |
| *F16J 15/06* | (2006.01) |
| *F16J 15/10* | (2006.01) |
| *C08K 5/14* | (2006.01) |
| *C08K 5/23* | (2006.01) |

(52) U.S. Cl.
CPC .............. *B60R 13/06* (2013.01); *B29C 44/18* (2013.01); *C08J 9/0023* (2013.01); *C08J 9/0061* (2013.01); *C08J 9/103* (2013.01); *C08J 9/105* (2013.01); *C08L 23/0853* (2013.01); *F16J 15/064* (2013.01); *F16J 15/068* (2013.01); *F16J 15/102* (2013.01); *C08J 2201/026* (2013.01); *C08J 2203/04* (2013.01); *C08J 2207/00* (2013.01); *C08J 2323/08* (2013.01); *C08J 2331/04* (2013.01); *C08J 2333/04* (2013.01); *C08J 2409/00* (2013.01); *C08J 2423/08* (2013.01); *C08J 2433/04* (2013.01); *C08K 5/14* (2013.01); *C08K 5/23* (2013.01); *C08L 2203/14* (2013.01); *C08L 2312/00* (2013.01)

(58) Field of Classification Search
CPC F16J 15/02; F16J 15/022; F16J 15/102; F16J 15/108

See application file for complete search history.

(56) References Cited

U.S. PATENT DOCUMENTS

2002/0120024 A1    8/2002   Koffler et al.
2008/0265516 A1* 10/2008   Walker ................. B29C 44/188
                                                                                      277/316

FOREIGN PATENT DOCUMENTS

WO        0130906 A1    5/2001
WO   2008034755 A1    3/2008

OTHER PUBLICATIONS

International Search Report for PCT/EP2013/073537, mailed Jul. 7, 2014. All references cited in the International Search Report are listed herein.

* cited by examiner

*Primary Examiner* — Gilbert Lee
(74) *Attorney, Agent, or Firm* — Mary K. Cameron

(57) ABSTRACT

The present specification relates to thermally expandable formulations comprising (a) at least one peroxidically cross-linkable binary copolymer comprising at least one monomer unit selected from vinyl acetate, (meth)acrylic acids and derivatives thereof, the binary copolymer having a melt flow index of not more than 3 g/10 min, as determined in accordance with DIN EN ISO 1133 and with a test load of 2.16 kg and a test temperature of 190° C., (b) at least one peroxide, (c) at least one chemical blowing agent, and (d) at least one polymer based on one or more diene monomers, and (e) at least one terpolymer based on at least one first monomer selected from singly or multiply unsaturated hydrocarbons, and on at least one second monomer selected from (meth)acrylic acids and derivatives thereof. The thermally expandable formulations exhibit a high level of persistence during the heating of the material as required for curing/expansion.

15 Claims, No Drawings

THERMALLY EXPANDABLE FORMULATIONS

STATEMENT REGARDING FEDERALLY SPONSORED RESEARCH

NONE

The present invention relates to a thermally expandable preparation containing a special, peroxidically crosslinkable, binary copolymer, a polymer based on one or more diene monomers as well as a special terpolymer, baffle parts containing this preparation for sealing cavities, a method for producing such baffle parts as well as a method for sealing cavities in components using such baffle parts.

Modern vehicles and vehicle parts have a variety of cavities that must be sealed to prevent the entrance of moisture and soiling, which can result in corrosion of the corresponding body parts from the inside. This relates in particular to modern, self-supporting vehicle body constructions, in which a heavy frame structure is replaced by lightweight, structurally rigid frame structures of prefabricated cavity profiles. Such constructions have a system-related series of cavities, which must be sealed to keep out moisture and soiling. Such seals additionally serve the purpose of preventing the propagation of airborne sound in such cavities and thereby reducing unpleasant vehicle operation and wind noises and thus increasing driving comfort in the vehicle.

Such frame and body parts comprising such cavities can be prefabricated from half-shell components, for example, which are then joined by welding, riveting, clinching and/or gluing at a later point in time to form the closed hollow profile. Consequently, with such a type of design, the cavity is easily accessible at an early assembly stage of an automotive body so that sealing and sound-absorbing baffle parts can be secured in this body shell phase by mechanical suspension, by insertion into corresponding retaining devices, boreholes or by welding. In addition, such hollow profiles can be manufactured from steel, aluminum or plastic materials by the extrusion method, hydroforming, die-casting or drawing methods. The resulting cavities are accessible only through openings into the cross section at the end of these profiles.

Baffle parts which have a sealing and/or acoustic effect in such cavities are often referred to as "pillar filler," "baffles" or "acoustic baffles." As a rule, they consist either completely of thermally expandable molded bodies or of molded bodies comprising a carrier and expandable polymer preparations in their peripheral region.

These baffle parts are fastened in the body shell by hanging, clipping, screwing or welding to the open structures. After closing the structures in the carcass and after the additional pretreatments to the body, the process heat from the ovens is then utilized for curing of the cathodic dip painting in order to trigger the expansion of the expandable part of the baffle part and thus seal the cross section of the cavity.

Both the body and the geometry of such baffle parts and the composition of the thermally expandable preparations are parameters that have recently been optimized further. Baffle parts comprising a thermally expandable composition and a carrier material, individually adapted in their geometry to the sound-absorbing cavity, are generally used.

Since the fabrication of two-component baffle parts from carrier material an expandable composition is very complex, there has long been a need for developing baffle parts that will reliably seal the cavity even in the absence of a carrier structure, without running out during curing. At the same time, there is a need to make available foams that have high expansion rates and can be used to mold universally usable baffle parts—ideally without a carrier material—that are capable of reliably sealing cavities of different geometries due to the great expansion.

Thus, for example, WO-A1-2001/30906 relates to self-supporting thermally expandable compositions and proposes that, before expansion, these compositions shall contain at least one modified polyethylene, at least one hydrazide blowing agent, at least one hydrocarbon resin and at least one curing agent that contains sulfur. The agents according to this specification are characterized by expansion rates of up to 1000%.

In addition, WO 2008/034755 A1 proposes the production of thermally curable compositions having high expansion rates from at least one anhydride-functionalized thermoplastic, one amine-functionalized latent curing agent and at least one latent blowing agent, which is preferably used together with a carrier material.

The object of the present invention was to make available thermally expandable compositions that do not require a carrier and at the same time have high expansion rates, so that baffle parts produced from these compositions can be used universally in a variety of cavity structures.

Furthermore, the compositions according to the invention should be able to meet the requirements of the curing process in the automotive industry, where this process usually takes place during the passage of the vehicle being produced through the oven for curing the cathodic dip painting.

With this type of curing there is the problem that not all parts of the vehicle are heated to the same temperature in the curing oven. Thus come regions come closer to the heating source during the curing process and are therefore exposed to higher temperatures ("overbaking").

Other regions however may be shielded from the heat due to the construction and fail to reach the optimum curing temperature ("underbaking"). Thus in particular the regions in the structural cavities are often shielded by thick metal walls and are not heated to the optimum temperatures because of the composition surrounding them. In other words these regions then only briefly reach maximum steps which are usually then significantly lower than the optimum conditions. Accordingly it is advantageous if the thermally expandable compositions are of such a type that they will expand to a sufficient extent over a wide temperature range and even with different curing times and in particular will not collapse at higher temperatures.

The state of the art agents have not yet been able to completely satisfy all demands of such baffle parts.

It has now been found that thermally expandable preparations containing a special peroxidically crosslinkable binary copolymer, a polymer based on one or more diene monomers, and in addition, a special terpolymer meet the demands made of such thermally expandable preparations to a great extent. The preparations according to the invention have a high durability during the required heating of the material for curing/expansion and thus also make it possible to achieve a high degree of expansion, in some cases even without the use of any carrier material and without the preparations slipping or falling down from the attachment point under the influence of gravity.

A first subject matter of the present invention is therefore thermally expandable preparations, comprising
(a) at least one peroxidically crosslinkable binary copolymer containing at least one monomer unit selected from vinyl acetate, (meth)acrylic acids and their derivatives, wherein the binary copolymer has a melt flow index of no more than 3 g/10 min which is determined according to DIN EN ISO 1133 with a test load of 2.16 kg and a test temperature of 190° C.,
(b) at least one peroxide,
(c) at least one chemical blowing agent and
(d) at least one polymer based on one or more diene monomers and
(e) at least one terpolymer based on at least one first monomer selected from the mono- or polyunsaturated hydrocarbons and at least one second monomer selected from the (meth)acrylic acids and derivatives thereof.

A first component essential to the invention is the peroxidically crosslinkable binary copolymer containing at least one monomer unit selected from vinyl acetate, (meth)acrylic acids and derivatives thereof having a melt flow index of no more than 3 g/10 min. "Peroxidically crosslinkable" is understood by those skilled in the art to be such polymers in which a hydrogen atom can be abstracted from the main chain or a side chain by the action of a free radical initiator, leaving behind a radical which will attack other polymer chains in a second reaction step. "Binary copolymers" are understood according to the invention to include all copolymers derived from a polymerization reaction of two different monomers. The invention of course also includes here such copolymers having additional monomers incorporated into their polymer chain in small amounts, for example, due to degradation reactions or impurities, so that these do not affect the properties of the binary copolymer.

The peroxidically crosslinkable binary copolymer according to the invention contains at least one monomer unit selected from vinyl acetate, (meth)acrylic acids and derivatives thereof. The prefix "(meth") in front of "acrylate" means as usual that these monomers may include acrylic acids and/or their derivatives as well as methacrylic acids and/or their derivatives. Particularly preferred monomer units of this group are vinyl acetate, butyl acrylate, methyl acrylate, ethyl acrylate and 2-ethylhexyl acrylate. Vinyl acetate is a particularly preferred representative of this group according to the invention.

The second monomer of the binary copolymer (a) according to the invention is preferably selected from the alkenes. Ethylene is a particularly preferred second monomer of the binary copolymer (a) in the sense of the present invention.

In a first preferred embodiment the at least peroxidically crosslinkable binary copolymer is selected from ethylene-vinyl acetate copolymers, functionalized ethylene-vinyl acetate copolymers, ethylene-butyl acetate copolymers, functionalized ethylene-butyl acrylate copolymers, ethylene-methyl acrylate copolymers, ethylene-ethyl acrylate copolymers, ethylene-(meth)acrylic acid copolymers and ethylene-2-ethylhexyl acrylate copolymers.

"Functionalized copolymers" are understood according to the invention to be a copolymer that has been provided with additional hydroxide groups, carboxyl groups, anhydride groups, acrylate groups and/or glycidyl methacrylate groups, preferably at the chain termini.

Especially advantageous in the sense of the present invention are ethylene-vinyl acetate copolymers, ethylene-butyl acrylate copolymers as well as their functionalized derivatives. Ethylene-vinyl acetate copolymers, in particular the representatives having no functionalization, may be especially preferred according to the invention.

Furthermore, the peroxidically crosslinkable binary copolymers according to the invention are characterized by a melt flow index of no more than 3 g/10 min. The melt flow index of the peroxidically crosslinkable polymers is determined according to the invention in a melt flow meter, wherein the polymer is melted at 190° C. in a heatable cylinder and then is forced through a defined standard nozzle (DIN EN ISO 1133) at a pressure resulting from the applied load (2.16 kg). The amount of the composition passing through the nozzle is determined as a function of time.

Peroxidically crosslinkable polymers, in particular an optionally functionalized ethylene-vinyl acetate copolymer having a melt flow index of 0.05 g to 2.5 g/10 min, in particular 0.1 g to 2.0 g/10 min, are especially preferable according to the invention.

Thermally expandable preparations containing at least one ethylene-vinyl acetate copolymer having a vinyl acetate content of 9 to 22% by weight, in particular 15 to 20% by weight, most particularly 17.5 to 19% by weight, based on the total weight of the binary copolymers are particularly preferred according to the invention.

The thermally expandable preparations preferably contain according to the invention at least 40% by weight of at least one or more of the peroxidically crosslinkable binary copolymers (a) according to the invention. Thermally expandable preparations containing 50 to 80% by weight, in particular 58 to 62% by weight of at least one or more of the peroxidically crosslinkable binary copolymers (a), each based on the total weight of the thermally expandable preparation are particularly preferred.

The thermally expandable preparations according to the invention preferably contain at least one peroxide as the second component essential to the invention. According to the invention the organic peroxides such as ketone peroxides, diacyl peroxides, peresters, perketals and hydroperoxides in particular are preferred. For example, cumyl hydroperoxide, t-butyl peroxide, bis(tert-butylperoxy) diisopropylbenzene, di(tert-butylperoxyisopropyl)benzene, dicumyl peroxide, t-butylperoxybenzoate, dialkylperoxydicarbonate, diperoxyketals (e.g., 1,1-di-tert-butylperoxy-3,3,5-trimethylcyclohexane), ketone peroxide (e.g., methyl ethyl ketone peroxide) and 4,4-di-tert-butylperoxy-n-butyl-valerates are particularly preferred.

The peroxides distributed commercially, for example, by the companies Akzo Nobel and Pergan GmbH are particularly preferred according to the invention such as 3,3,5,7,7-pentamethyl-1,2,4-trioxepan, 2,5-dimethyl-2,5-di(tert-butylperoxy)hex-3-yne, di-tert-butyl peroxide, 2,5-dimethyl-2,5-di(tert-butylperoxy)hexane, tert-butylcumyl peroxide, di(tert-butylperoxyisopropyl)benzene, dicumyl peroxide, butyl-4,4-di(tert-butylperoxy) valerate, tert-butylperoxy-2-ethylhexylcarbonate, 1,1-di-(tert-butylperoxy)-3,3,5-trimethylcyclohexane, tert-butylperoxybenzoate, di-(4-methylbenzoyl) peroxide and dibenzoyl peroxide.

It has also proven to be advantageous according to the invention if the peroxides used are essentially inert at room temperature and are activated only when heated to higher temperatures (for example, when heated to temperatures between 130° C. and 240° C.). It is particularly advantageous according to the invention if the peroxide used has a half-life of more than 60 minutes at 65° C., i.e., less than half of the peroxide used has decomposed after heating the thermally expandable preparation containing the peroxide to 65° C. for 60 minutes. According to the invention such peroxides which have a half-life of 60 minutes at 115° C. may be particularly preferred.

It may be especially preferable according to the invention to use di-(tert-butyl-peroxyisopropyl)benzene as the peroxide. This is available commercially, for example, under the brand names Perkadox® 14-40 B-PD or Perkadox® 14-40

K PD from the company Akzo Nobel or under the brand name Peroxan® BIB 40 GS or Peroxan® BIB 40 P from the company Pergan.

In another form according to the invention, it may also be preferable to use dicumyl peroxide, such as that available under the brand names Perkadox® BC 40 K PD, Perkadox® BC 40BGR DD or Perkadox® BC 40 B PD from the company Akzo Nobel, for example, or under the brand names Peroxan® DC 40 GS, Peroxan® DC 40 P or Peroxan® DC 40 PK from the company Pergan. The use of dicumyl peroxide may be most particularly preferred according to the invention.

Furthermore, it is advantageous according to the invention if the at least one or more peroxides is used in a form in which it is applied to a solid inert carrier such as calcium carbonate and/or silica and/or kaolin.

The at least one or more peroxides is preferably contained in the thermally expandable preparations according to the invention in an amount of 0.2 to 2% by weight, in particular in an amount of 0.3 to 1% by weight, most particularly in an amount of 0.4 to 0.6% by weight, each determined as the active substance content of peroxide based on the total weight of the thermally expandable preparation.

The thermally expandable preparations preferably contain at least one chemical blowing agent as the third component essential to the invention.

A chemical blowing agent is understood according to the invention to be a compound that decomposes when exposed to heat and therefore releases gases.

Examples of such chemical blowing agents include azo compounds, hydrazide compounds, nitroso compounds and carbazide compounds, such as, for example, azobisisobutyronitrile, azodicarbonamide (ADCA), dinitrosopentamethylene tetramine, 4,4'-oxybis(benzenesulfonic acid hydrazide) (OBSH), azocyclohexylnitrile, azodiaminobenzene, benzene-1,3-sulfonylhydrazide, calcium azide, 4,4'-diphenyldisulfonylazide, diphenylsulfone-3,3'-disulfohydrazide, benzene-1,3-disulfohydrazide, trihydrazinotriazine, p-toluenesulfonyl hydrazide and p-toluenesulfonyl semicarbazide.

The use of azodicarboamide and/or sulfonic acid hydrazide has proven preferable according to the invention. Preferred sulfonic acid hydrazides include in particular 4,4'-oxybis(benzenesulfonic acid hydrazide) (OBSH), benzene-1,3-sulfonic acid hydrazide and 4-methylbenzenesulfonic acid hydrazide. Azodicarbonamide is a most particularly preferred chemical blowing agent according to the invention.

It may be preferable according to the invention if the thermally expandable preparations contain a first blowing agent, which is already activated at temperatures below 140° C., and a second blowing agent, which is activated only at temperatures above 160° C.

Within the context of this embodiment, preparations having a blowing agent content of 5 to 18% by weight, in particular 7 to 15% by weight, most particularly 9 to 13% by weight, each based on the total composition of the thermally expandable preparation, have proven to be advantageous.

The chemical blowing agents according to the invention can advantageously be used in combination with activators and/or accelerators, such as, for example, zinc compounds (for example, zinc oxide, zinc stearate, zinc ditoluene sulfinate, zinc dibenzene sulfinate), magnesium oxide and/or (modified) ureas. The zinc compounds, in particular zinc oxide are particularly preferred according to the invention.

According to the invention, it does not matter substantially whether the blowing agents are already used in an activated form or whether the thermally expandable preparations additionally contain a corresponding activator and/or accelerator, for example, zinc oxide, in addition to the blowing agent.

It has proven to be particularly advantageous if the thermally expandable preparations according to the invention contain the activators and/or accelerators, in particular the zinc compounds, most particularly zinc oxide in an amount of 0 to 15% by weight, in particular of 0.2 to 5% by weight, most particularly preferably of 1 to 3% by weight, each based on the total weight of the thermally expandable preparation.

Furthermore, preparations containing an amount of already activated azodicarbonamide of 5 to 18% by weight, in particular 7 to 15% by weight, most particularly of 9 to 13% by weight, each based on the total weight of the thermally expandable preparation have proven advantageous, wherein the activated azodicarbonamide used has an activator content of 1 to 10% by weight, based on the amount of activated azodicarbonamide.

The thermally expandable preparations contain at least one polymer based on one or more diene monomers as the third ingredient essential to the invention. Although in principle there are no restrictions with respect to the diene monomers, it has proven advantageous according to the invention if a polymer based on at least one alkadiene monomer is used. Homopolymers based on a diene monomer may be particularly preferred polymers (d) according to the invention.

Although the use of nonfunctionalized polymers (d) is usually preferred, in exceptional cases, the polymers (d) may also be functionalized with additional hydroxide groups, carboxyl groups, and hydride groups, acrylate groups and/or glycidyl methacrylate groups, preferably at the chain termini.

Particularly preferred diene monomers according to the invention are 1,2-butadiene, 1,3-butadiene as well as isoprene. 1,3-Butadiene and isoprene are most particularly preferred diene monomers according to the invention.

In addition, polymers (d) having an average molecular weight of at least 30,000 g/mol have proven to be preferable according to the invention. Polymers (d) with an average molecular weight of at least 50,000 g/mol may be particularly preferred according to the invention. In this content the average molecular weight of polymers is understood to be the weight-average molecular weight ($M_w$), which can be determined by gel permeation chromatography (GPC) using polystyrene as the standard.

Particularly advantageous properties can be obtained when the polymer (d) is selected from the group formed by the polybutadiene homopolymers, the polyisoprene homopolymers and the butadiene isoprene copolymers. Thus the inventive preparations containing these polymers (d) are characterized by a good injection behavior by injection molding, a good durability as well as low runoff during curing.

In addition, it is preferable according to the invention if the polymer (d) contains 1,3-butadiene as a monomer component.

Furthermore, according to the invention, polybutadienes based on 1,3-butadiene and having at least 90 mol % 1,2-linkages are preferred. Such polybutadienes are also referred to as 1,2-polybutadienes according to the invention.

It may also be preferable if the polymer (d) has a syndiotactic structure. Syndiotactic 1,2-polybutadiene is a particularly preferred polymer (d) in the sense of the present invention.

Furthermore, it is particularly preferred according to the invention if component (d) is solid at room temperature. According to the invention, polymers are referred to as "solid" if the geometry of these polymers does not deform under the influence of gravity within 1 hour at the stated temperature, in particular within 24 hours.

Polymers based on one or more diene monomers having a melt flow index of at least 2 g/10 min, in particular of 2 to 10 g/10 min, most particularly of 3 to 7 g/10 min are particularly preferred according to the invention. The melt flow index of component (d) is determined according to the invention in a melt flow meter where the polymer is melted at 150° C. in a heatable cylinder and is forced through a defined standard nozzle (DIN EN ISO 1133) under a pressure resulting from the applied load (2.16 kg). The ejected weight is determined as a function of time.

Within the context of this embodiment, preparations having a polymer content based on one or more diene monomers of 2 to 20% by weight, in particular of 3 to 20% by weight, most particularly of 4 to 7% by weight, each based on the total weight of the thermally expandable preparation have proven to be advantageous.

As the fifth component essential to the invention, the thermally expandable preparations contain at least one terpolymer based on at least one first monomer, selected from the mono- or polyunsaturated hydrocarbons, and at least second monomer selected from the (meth)acrylic acids and derivatives thereof.

It has proven to be preferred according to the invention if the first monomer unit of the terpolymer is a mono- or polyunsaturated acyclic hydrocarbon. Alkenes and dienes are particularly preferred representatives of this group. The monomer units ethylene, propylene, 1,2-butadiene, 1,3-butadiene and isoprene are most particularly preferred representatives of this group according to the invention.

The second comonomer of terpolymer is selected from (meth)acrylic acid and derivatives thereof, wherein, as usually, the prefix "(meth)" in front of "acrylate" means that these monomers may be acrylic acids and/or acrylic acid esters as well as methacrylic acids and/or methacrylic acid esters. If the terpolymer according to the invention contains acrylic acid esters and/or methacrylic acid esters, then the alcohol component of the ester is preferably selected from those containing 1 to 6 carbon atoms. Methyl ester, ethyl ester and butyl ester may be used in particular.

In a preferred embodiment of the present invention, the third comonomer of the component (e) selected from the group is formed by styrene, glycidyl (meth)acrylate acid esters and maleic acid anhydride.

The glycidyl (meth)acrylic acid esters are understood to include the esters of acrylic acid and/or methacrylic acid with glycidol (2,3-epoxypropan-1-ol) according to the invention.

Especially good runoff behavior has been achieved according to the invention when the following are used as the terpolymer (e):
  styrene-butadiene-(meth)acrylate acids,
  styrene-butadiene-(meth)acrylic acid esters,
  ethylene-(meth)acrylic acid ester-glycidyl (meth)acrylic acid ester and/or
  ethylene-(meth)acrylic acid ester-maleic acid anhydrides, such as in particular ethylene-ethyl acrylate-maleic acid anhydride and ethylene-butyl acrylate-maleic acid anhydride.

Even if the component (e) according to the invention is defined as a terpolymer, it should of course also include copolymers, which contain other monomers, for example, those from degradation reactions or impurities, in such small amounts that they have no effect on the properties of the terpolymers according to the invention.

The use of the terpolymers according to the invention in the preparations according to the invention permits a better durability of the preparations during the heating of the material which is required for curing/expansion. Furthermore, it has surprisingly been found that the use of these terpolymers permits a uniform expansion even at different temperatures, i.e., that the degree of expansion of preparations containing these terpolymers varies less than that of traditional preparations in underbaking, ideal baking and overbaking conditions.

In addition to the components according to the invention, the thermally expandable preparations in a special embodiment may contain at least one low-molecular multifunctional acrylate.

According to the invention, the term "low-molecular multifunctional acrylate" is understood to be a compound having at least two acrylate groups and a molecular weight of less than 2400 g/mol, preferably less than 800 g/mol.

According to the invention, such compounds having two, three or more acrylate groups per molecule have proven to be advantageous.

Preferred difunctional acrylates are ethylene glycol dimethacrylate, diethylene glycol dimethacrylate, triethylene glycol dimethacrylate, triethylene glycol diacrylate, tripropylene glycol dimethacrylate, 1,4-butanediol dimethacrylate, 1,3-butylene glycol dimethacrylate, 1,3-butanediol dimethacrylate, tricyclodecane dimethanol dimethacrylate, 1,10-dodecandiol dimethacrylate, 1,6-hexanediol dimethacrylate, 2-methyl-1,8-octanediol dimethacrylate, 1,9-nonanediol dimethacrylate, neopentyl glycol dimethacrylate and polybutylene glycol dimethacrylate.

Preferred low-molecular acrylates having three or more acrylate groups are glycerol triacrylate, dipentaerythritol hexaacrylate, pentaerythritol triacrylate (TMM), tetramethylolmethane tetraacrylate (TMMT), trimethylolpropane triacrylate (TMPTA), pentaerythritol tetraacrylate, di(trimethylolpropane) tetraacrylate (TMPA), pentaerythritol tetraacrylate, trimethylolpropane trimethacrylate (TMPTMA), tri(2-acryloxyethyl) isocyanurate and tri(2-methacryloxyethyl) trimellitate as well as their ethoxylated and propoxylated derivatives containing max. 35 EO units and/or max. 20 PO units.

Thermally expandable preparations containing a low-molecular multifunctional acrylate selected from triethylene glycol diacrylate, triethylene glycol dimethacrylate, trimethylolpropane triacrylate (TMPTA) and trimethylolpropane trimethacrylate (TMPTMA), pentaerythritol triacrylate (TMM), tetramethylolmethane tetraacrylate (TMMT), pentaerythritol trimethacrylate, di(trimethylolpropane) tetraacrylate (TMPA) and pentaerythritol tetraacrylate are most particularly preferred according to the invention.

According to the invention it has proven especially advantageous if the thermally expandable preparations contain at least one low-molecular multifunctional acrylate selected triethylene glycol diacrylate, trimethylolpropane triacrylate (TMPTA) and trimethylolpropane trimethacrylate (TMPTMA).

The low-molecular multifunctional acrylates are contained in the thermally expandable preparations preferably in an amount of 0.2 to 2.5% by weight, in particular of 0.4 to 1.4% by weight, each based on the total weight of the thermally expandable preparation.

Use of the low-molecular multifunctional acrylates has proven to be especially advantageous according to the invention for the stability of the resulting foam if the thermally expandable preparations either contain little terpolymer (e) or little peroxide. In particular in the case of preparations having a peroxide content of max. 1.5% by weight and a terpolymer content of max. 3% by weight, addition of low-molecular acrylates has proven to be especially advantageous.

In the course of the work forming the basis for this patent application however it has been demonstrated that the thermally expandable preparations can be further optimized with regard to their behavior under suboptimal curing temperatures if they are formulated essentially without these low-molecular multifunctional acrylates. Compositions containing less than 0.25% by weight, in particular less than 0.15% by weight low-molecular multifunctional acrylates are referred to as being "essentially free of these low-molecular multifunctional acrylates." Thermally expandable compositions formulated without low-molecular multifunctional acrylates may be most particularly preferred according to the invention.

In another embodiment of the present invention, it may be preferable if the thermally expandable preparation compositions additionally contain at least one hydrocarbon resin.

"Hydrocarbon resins" are understood to be thermoplastic polymers according to the invention that can be produced from petroleum fractions and have a maximum average molecular weight of 2500 g/mol. Hydrocarbon resins having an average molecular weight of max. 2000 g/mol may be particularly preferred according to the invention. Within the context of the present patent application, the average molecular weight of polymers is understood in general to be the weight-average molecular weight. Within the context of the present invention, the weight-average molecular weight ($M_w$) can be determined by gel permeation chromatography (GPC) using polystyrene as the standard.

The hydrocarbon resins may be completely aliphatic or completely aromatic or they may have both aliphatic and aromatic structures. In addition, they may be aromatically modified aliphatic resins. In any case, compatibility with the polymer matrix is essential. Commercial products such as Escorez® 1102, Escorez® 2173, Escorez® 2184, Escorez® 2101, Escorez 2105, Novares® TK, Novares® TL 100, Novares® TV, Novares® TA, Novares® TP, Novares® TR, Novares® TS, Novares® TW, Necires® LF 220 and Nevtac® 10 may be used for this purpose.

Hydrocarbon resins having a softening point of >10° C., preferably having a softening point of >40° C., and in particular having a softening point of >70° C. are particularly preferred according to the invention.

The hydrocarbon resins are preferably contained in the thermally expandable preparations in an amount of 0.2 to 25% by weight, in particular 5 to 20% by weight, most particularly preferably 8 to 15% by weight, each based on the total weight of the thermally expandable preparation.

The thermally expandable preparations according to the invention are characterized in particular in that they do not slip down from the attachment point under the influence of gravity during the curing process, even at high expansion rates, and they do not fall over during expansion. Instead, they expand at the site where they have been introduced into the cavity and expand in the direction of the opposing walls of the cavity. It is therefore especially preferable according to the invention if the thermally expandable preparations have a degree of expansion of at least 1000%, preferably at least 1500%, in particular at least 2000%. The stated degree of expansion therefore refers to the volume of the composition at room temperature before and after 30 minutes of heating at an activation temperature of 170° C.

In addition to the ingredients according to the invention, the thermally expandable compositions also contain the usual components, such as dyes, fillers and antioxidants, for example.

Fillers that may be used include, for example, the various ground or precipitated chalks, calcium magnesium carbonates, talc, graphite, heavy spar, silicic acids or silica as well as silicatic fillers in particular, such as, for example, mica, e.g., in the form of chlorite, or silicatic fillers of the aluminum-magnesium-calcium silicate type, for example, wollastonite. Talc is an especially preferred filler.

The fillers are preferably used in an amount of 0 to 16% by weight, in particular of 0.1 to 10% by weight, each based on the weight of the total thermally expandable preparation.

Coloring components, in particular black dyes based on carbon blacks, are preferably contained in the thermally expandable preparations according to the invention in an amount of 0 to 2% by weight, in particular of 0.1 to 0.8% by weight, most particularly preferably 0.15 to 0.4% by weight, each based on the weight of the total thermally expandable preparation.

The antioxidants or stabilizers used according to the invention may be, for example, sterically hindered phenols and/or sterically hindered thioethers and/or sterically hindered aromatic amines such as, for example, bis-(3,3-bis-(4'-hydroxy-3-tert-butylphenyl)butanoic acid) glycol ester.

Antioxidants or stabilizers are preferably present in the thermally expandable preparations according to the invention in an amount of 0 to 0.5% by weight, in particular of 0.1 to 0.3% by weight, each based on the weight of the total thermally expandable preparation.

The thermally expandable preparations according to the invention are preferably formulated in such a way that they are solid at 22° C. A thermally expandable preparation is referred to according to the invention as "solid" when the geometry of this preparation does not undergo deformation under the influence of gravity within 1 hour at the stated temperature, in particular within 24 hours.

The thermally expandable preparations according to the invention can be produced by mixing the selected components in any suitable mixer such as, for example, a kneader, a double-arm mixer, an internal mixer, a twin-screw mixer, a continuous mixer or an extruder, in particular a twin-screw extruder.

Although it may be advantageous to heat the components slightly to facilitate achieving a homogeneous uniform composition, care must be taken to ensure that temperatures capable of activating the peroxide and/or the blowing agent mixture are not reached. The resulting thermally expandable preparation can be shaped immediately after being prepared, for example, by blow molding, pelletizing, injection molding methods, mold pressing methods, punching methods or extrusion.

Although it may be preferable according to the invention to prepare the entire thermally expandable preparation, then extrude and store it in pellet form, for example, until production of the baffle parts, it has also proven advantageous according to the invention to formulate the thermally expandable preparation as a two-component agent up to the stage of thermoforming.

These two-component agents preferably comprise a first component, which contains a small portion of the total amount of peroxidically crosslinkable polymer as well as all the other components. This first component can be prepared and stored separately. This separation of the total preparation into two components permits a cost-optimized production of the baffle parts because all the critical ingredients are contained in the first formulation, which has a lower weight than the final, thermally expandable preparation. Preferably max. 20% of the total amount of the peroxidically crosslinkable polymer is contained in the first component. The second component then contains the remaining amount of the polymer as well as optionally additional additives and auxiliary substances. It may be preferable according to the invention if the second component contains only the remaining amount of the polymer.

Before production of the baffle parts, the two-component agent can then be mixed in an injection molding machine having a twin screw and injected into the desired mold. However, it is also possible according to the invention to mix the two-component agent first with the complete thermally expandable preparation, to pelletize the mixture and then to inject the complete pelletized preparation into the mold in a separate step.

The expansion of the thermally expandable preparation takes place by heating, wherein the preparation is heated to a certain temperature for a certain period of time sufficient to induce activation of the blowing agent as well as the peroxide.

Depending on the composition of the preparation and the conditions of the manufacturing line, such temperatures are usually in the range of 130° C. to 240° C., preferably 150° C. to 200° C. with a dwell time of 10 to 90 minutes, preferably 5 to 60 minutes.

In the field of automotive engineering, it is especially advantageous if the expansion of the preparations according to the invention takes place during the passage of the vehicle through the oven for curing the cathodic dip painting so that a separate heating step may be omitted.

The thermally expandable preparations of the present invention can be used in a wide range of sealing and adhesive applications, for example, in the field of baffle parts for sealing cavities in vehicles. However, use as a substrate adhesive, for example, in the door or roof areas is also conceivable. For such an intended use, the thermally expandable preparations according to the invention can be applied by direct extrusion. However the preparations can also be brought to the site of application in the extruded form and pressed and partially fused there by heating the steel. As the third alternative, application as a co-extrudate is also conceivable. In this embodiment a second tacky preparation is applied in a thin layer beneath the actual non-tacky molded body of the thermally expandable preparation according to the invention. Within the context of this embodiment, this second tacky layer serves to affix the molded body in the shell.

The thermally expandable preparations are particularly suitable for production of baffle parts accordingly, i.e., for production of parts used in cavities in vehicles, then expanded by heating and at the same time cured, to thereby seal the cavity as much as possible.

A second subject matter of the present invention is a baffle part accordingly, for sealing cavities of a component having a shape that is adapted to the cavity and having a thermally expandable preparation according to the invention.

A "shape adapted to the cavity" is understood according to the invention to refer to all geometries of baffle parts which ensure a complete sealing of the cavity after expansion. The shape of the baffle part can be adapted individually to the shape of the cavity and may have corresponding peaks and/or rounded parts. In the case of the thermally expandable compositions according to the invention having high degrees of expansion, however, the introduction of a suitably large amount in a variable shape, for example, in the form of a bead or a strand of the material cut to length, may be sufficient in the cavity to ensure a complete sealing of the cavity after expansion.

Such baffle parts are usually produced from the thermally expandable preparations according to the invention by injection molding techniques. The thermally expandable preparations are then heated to temperatures in the range of 70 to 90° C. and then injected into a suitably designed mold.

It is preferable according to the invention if the baffle parts have at least one fastening element, which permits anchoring of the baffle part in the cavity.

In a particularly preferred embodiment of this subject matter of the present invention, the baffle parts are produced completely from the thermally expandable preparation. Thus the preparation can be brought to the desired shape of the baffle part by punching it out of a prefabricated sheet or by extrusion through a die mold and subsequently cutting it to length. It is not necessary to use a carrier material in this embodiment.

In this embodiment, fastening elements are an integral component of the baffle part, i.e., these fastening elements are also fabricated from the thermally expandable preparation. Such fastening elements may assume the shape of a bulge and may thus contribute to the baffle part remaining in the intended location in the cavity.

Thus the fastening elements may be designed, for example, so that they can be introduced into an opening in the cavity, whereupon they are preferably designed so that they cannot be removed from the opening (for example, through the use of hooks or suitable elevations). It is preferable in particular if the fastening elements are manufactured from the thermally expandable preparation because this will also completely seal off these openings as a result of the expansion due to heating.

In another embodiment of this subject matter of the present invention, only the main ingredient of the baffle part is manufactured from the thermally expandable preparation. The baffle parts in this embodiment also contain, in addition to the expandable main part, fastening element made of another non-expandable material such as, for example, metal or heat-resistant plastic. Thus, for example, a pin or a compressible stopper may be anchored as a fastening element on one edge in the thermally expandable preparation, so that it can be inserted into an opening in the cavity to be sealed.

Although the thermally expandable compositions according to the invention allow manufacturing of baffle parts without a carrier material, these can nevertheless also be used in the traditional manner with a carrier. In this embodiment, the baffle part has a carrier to which the thermally expandable preparation is applied. In the embodiment, the carrier may be used to direct the expanding foam in the direction of the walls of the cavity to prevent a collapse or some other unwanted deformation of the foam. The amount of thermally expandable preparation in the baffle part is preferably selected, so that the foamed material completely fills up the interspace between the baffle part and the cavity walls and thus seals the cavity and prevents the transfer of noise.

The carrier is preferably made of a thermoplastic material that is sufficiently fracture resistant under normal use conditions and has a melting point or softening point above the curing temperature of the component. The carrier is preferably made of a variety of polymer materials such as, for example, polyesters, aromatic polyethers, polyether ketones and in particular polyamides such as nylon 66, for example. In addition to the polymer ingredients, the carrier material may also contain additional additives and fillers, such as dye and/or reinforcing fibers. Alternatively, the carrier may also be manufactured from metal, for example, steel or aluminum.

The thermally expandable preparation can be produced jointly with the carrier by traditional methods. In particular, injection molding methods in which those components are injected are especially advantageous. However, it is also preferable according to the invention if the carrier material is injected in a separate step and only then is the thermally expandable composition applied to the carrier in a separate step, optionally even by means of a separate machine.

The baffle parts according to the invention may be used in any products having cavities. In addition to automobiles, these also include, for example, airplanes, rail vehicles, household appliances, furniture, buildings, walls partitions or even boats.

Another subject matter of the present invention is a method for sealing cavities of a component, wherein a baffle part according to the invention is introduced into the cavity and then heated to a temperature above 130° C., so that the thermally expandable preparation expands and seals the cavity.

With respect to the details of this subject matter of the present invention, what was already said about the other subject matters also applies here, mutatis mutandis.

Another subject matter of the present invention is the use of a baffle part according to the invention for acoustic sealing of cavities in components and/or for sealing cavities in components against water and/or humidity.

With respect to the details of this subject matter of the present invention, what was said already about the other subject matters also applies here, mutatis mutandis.

EXEMPLARY EMBODIMENTS

1. Preparation of the Formulations

The raw materials Escorene® Ultra UL 00218 CC 3 and RB 810 were first mixed in a kneading mixer at 130° C. according to the specifications in Table 1 until a homogeneous composition was obtained. Next, the other raw materials were added, one after the other, whereupon the mixture was cooled, so that the mixture was not heated to temperatures above 99° C.

2. Determination of the Expansion

To determine the expansion, test bodies with the dimensions 240 mm×240 mm×6 mm were cut from the finished sheets and were then inserted into a circulating air oven, which was heated to the temperature listed in Table 1 (heating time approx. 7 to 10 min) and the test bodies where then left at this temperature for the period of time listed in Table 1. The expansion at 170° C. corresponds to the ideal conditions, which are achieved as part of curing in automotive engineering. Expansion at 150° C. simulates the underbaking conditions, while expansion at 190° C. simulates overbaking conditions.

The extent of the expansion was determined by means of the water displacement method according to the formula $$\text{Expansion} = \frac{(m2 - m1)}{m1} \times 100$$

m1=mass of the test body in the original state, in deionized water m2=mass of the test body after baking, in deionized water 3. Determination of the Runoff Behavior To determine the runoff behavior, test bodies with the dimensions 10 mm×10 mm×4 mm were cut from finished sheets and then melted on a horizontal oiled metal plate (galvanized zinc, oiling with 3 g/m²) for 5 minutes at 100° C. in a circulating air oven. After cooling, the sheet metal prepared in this way was positioned vertically for 30 minutes at 175° C. in a circulating air oven, so that the product would expand. After removing the sheet metal from the oven and then cooling it, the runoff and/or slippage of the resulting foam was evaluated in comparison with the starting position.

4. Formulations and Measurement Results 4.1 Table Summary

The quantitative amounts are understood to be percent by weight (wt %), unless otherwise indicated.

TABLE 1

|  | W1 | W2 | W3 | W4 | E1 | E2 | E3 |
|---|---|---|---|---|---|---|---|
| Elvax ® 470A | 71.1 | 69.8 | 73.9 | 71.4 | — | 59.4 | 58.9 |
| Escorene ® Ultra UL 00218 CC3 | — | — | — | — | 59.4 | — | — |
| RB 810 | 2.8 | 5.00 | — | 2.8 | 5.0 | 5.0 | 5.0 |
| Novares ® TL 100 | 10.5 | — | 10.8 | 10.4 | 10.4 | 10.4 | 10.5 |
| Necires ® LF 220 | — | 10.5 | — | — | — | — | — |
| Zinc oxide Activox ® B | 2.8 | 2.8 | 2.9 | 2.8 | 2.7 | 2.7 | 2.8 |
| Monarch ® 280 | 0.2 | 0.2 | 0.2 | 0.2 | 0.2 | 0.2 | 0.2 |
| Perkadox ® BC 40BGR DD | 0.6 | 0.6 | 0.6 | 1.3 | 1.3 | 1.3 | 1.3 |
| Celogen ® AZ 130 | 11.1 | 11.1 | 11.6 | 11.1 | 11.1 | 11.1 | 11.1 |
| Lotader ® AX 8900 | — | — | — | — | 9.9 | 9.9 | 10.0 |
| Sartomer ® SR 350 | 0.9 | — | — | — | — | — | 0.2 |
| TOTAL | 100 | 100 | 100 | 100 | 100 | 100 | 100 |
| Expansion at 30 min @ 150° C. (%) | 1500-1600 | 1500-1600 | 1200-1300 | 1200-1300 | 1800-1900 | 1600-1700 | 1400-1500 |
| Expansion at 30 min @ 170° C. (%) | 1400-1500 | 1400-1500 | 200-300 | 2000-2100 | 2500-2600 | 2100-2200 | 1950-2000 |
| Expansion at | 500- | 750- | 200- | 800- | 2400- | 1800- | 1700- |

TABLE 1-continued

|  | W1 | W2 | W3 | W4 | E1 | E2 | E3 |
|---|---|---|---|---|---|---|---|
| 30 min @ 190° C. (%) | 600 | 800 | 300 | 900 | 2500 | 1900 | 1800 |
| Runoff behavior | no runoff, no slippage | heavy runoff, heavy slippage | heavy runoff | heavy runoff | no runoff, no slippage | no runoff, no slippage | no runoff, no slippage |

4.2 Index of Commercial Products Used

Celogen® AZ 130 Azodicarbonamide (Safic Alcan)

Elvax® 470A Ethylene-vinyl acetate copolymer (approx. 18% by weight vinyl acetate content in the copolymer, melting point 89° C., melt flow index 0.7 g/10 min at 190° C. under a load of 2.16 kg) (DuPont)

Escorene® Ultra UL 00218 CC3 Ethylene-vinyl acetate copolymer (approx. 18% by weight vinyl acetate content in the copolymer, melting point 86° C., melt flow index 1.7 g/10 min at 190° C. and a load of 2.16 kg) (Exxon Mobil)

Lotader® AX 8900 Terpolymer of ethylene, acrylic acid ester and glycidyl methacrylate with a random arrangement (acrylic acid ester content 24% by weight, glycidyl methacrylate content 8% by weight) (Arkema)

Monarch® 280 Carbon black (degree of purity at least 99%) (Cabot)

Necires® LF 220 Hydrocarbon resin; polymerization product of cycloaliphatic and alkylaromatic monomers (Rüttgers Chemicals)

Novares® TL 100 Hydrocarbon resin; polymerization product of unsaturated aromatic $C_9$ to $C_{10}$ hydrocarbons (Rüttgers Chemicals)

Perkadox® BC 40BGR DD Dicumyl peroxide on a chalk-silica carrier approx. 40% by weight active substance content (Akzo Nobel)

RB 810 Syndiotactic 1,2-polybutadiene homopolymer (melt flow index 3 g/10 min at 150° C. and a load of 2.16 kg; melting point 71° C.) (Japan Synthetic Rubber)

Sartomer® SR 350 Trimethylolpropane trimethacrylate (Sartomer)

Zinc oxide Activox® B Zinc oxide (degree of purity 99.9%) (NRC Nordmann Rassmann)

4.3 Evaluation

The exact compositions of the various formulations as well as the results of the determination of the expansion behavior and the runoff behavior under various baking conditions were summarized in Table 1.

Whereas the preparations E1 to E3 according to the invention have expansion values of 1400-2600% under the tested conditions, in particular advantageous values of 1950-2600% under standard conditions and overbaking conditions, the comparative formulations VV1-VV4 show a definitely lower expansion volume of 200-2100%. In particular in the case of overbaking conditions, expansion values of the comparative formulations VV1-VV4 of only max. 900% are achieved.

With all the baking conditions tested, however, the expansion values of all the formulations E1-E3 according to the invention remain at a consistently high level of more than 1400%, while the comparative formulations W1-W4 have much greater fluctuations. Shrinkage of the comparative formulations is observed In particular with overbaking conditions (30 min at 190° C.), which can result in leakage in the application field.

Based on the consistently high expansion values of the compositions E1-E3 according to the invention, it is possible to seal cavities completely and reliably by using these compositions.

In addition, the results in Table 1 indicate that the compositions E1-E3 according to the invention do not run off, slip or sag during baking. In particular in the vertical position, the foams remain stable during the baking process. However, the comparative formulations VV2-VV4 exhibit great runoff and slippage during baking, so that in a vertical position, a cavity cannot be filled completely using these formulations. VV1 does not exhibit any runoff/slippage during baking, but the expansion is inadequate, in particular under overbaking conditions, because the foam shrinks unfavorably.

The invention claimed is:

1. A thermally expandable composition, comprising:
   (a) at least one peroxidically crosslinkable binary copolymer containing at least one monomer unit, selected from vinyl acetate, (meth)acrylic acids and derivatives thereof, wherein the binary copolymer has a melt flow index of no more than 3 g/10min, which is determined in accordance with DIN EN ISO 1133 with a test load of 2.16 kg and a test temperature of 190° C.,
   (b) at least one peroxide,
   (c) at least one chemical blowing agent and
   (d) at least one polymer based on one or more diene monomers and
   (e) at least one terpolymer based on at least one first monomer selected from the mono-or polyunsaturated hydrocarbons, and at least one second monomer selected from the (meth)acrylic acids and derivatives thereof.

2. The thermally expandable composition according to claim 1, wherein the peroxidically crosslinkable polymer (a) is selected from ethylene-vinyl acetate copolymers, functionalized ethylene-vinyl acetate copolymers, ethylene-butyl acrylate copolymers, functionalized ethylene-butyl acrylate copolymers, ethylene-methyl acrylate copolymers, ethylene-ethyl acrylate copolymers, ethylene-(meth)acrylic acid copolymers and ethylene-2-ethylhexyl acrylate copolymers and mixtures thereof.

3. The thermally expandable composition according to claim 1, comprising as component (a) an ethylene-vinyl acetate copolymer.

4. The thermally expandable composition according to claim 1, comprising as component (c) a sulfonic acid hydrazide and/or azodicarbonamide.

5. The thermally expandable composition according to claim 1, wherein the polymer (d) is selected from polybutadiene homopolymers, polyisoprene homopolymers and butadiene-isoprene copolymers.

6. The thermally expandable composition according to claim 1, wherein the polymer (d) has a syndiotactic structure.

7. The thermally expandable composition according to claim 1, wherein the terpolymer (e) has a third monomer unit selected from styrene, glycidyl (meth)acrylic acid esters and maleic acid anhydride.

8. The thermally expandable composition according to claim 1, wherein the composition additionally contains at least one low-molecular multifunctional acrylate.

9. The thermally expandable composition according to claim 1, wherein the composition is essentially free of low-molecular multifunctional acrylates.

10. The thermally expandable composition according to claim 1, wherein the composition additionally contains at least one hydrocarbon resin.

11. The thermally expandable composition according to claim 1, comprising:
- 50 to 80% by weight of (a) the at least one peroxidically crosslinkable binary copolymer,
- 0.2 to 2% by weight of (b) the at least one peroxide,
- 5 to 18% by weight of (c) the at least one chemical blowing agent, and
- wherein the terpolymer (e) is selected from:
    - styrene-butadiene-(meth)acrylate acids,
    - styrene-butadiene-(meth)acrylic acid esters,
    - ethylene-(meth)acrylic acid ester-glycidyl (meth)acrylic acid ester and/or
    - ethylene-(meth)acrylic acid ester-maleic acid anhydrides.

12. A baffle part for sealing a cavity of a component, wherein the baffle part has a shape adapted to a cavity to be sealed and includes a thermally expandable composition according to claim 1.

13. The baffle part according to claim 12, wherein the baffle has at least one fastening element, which permits anchoring of the baffle in the cavity.

14. The baffle part according to claim 12, wherein the baffle does not have a carrier structure.

15. A method for sealing a cavity of a component wherein a baffle part according to claim 11 is introduced into a cavity and is then heated to a temperature above 130° C. such that the thermally expandable composition expands and seals the cavity.

* * * * *

UNITED STATES PATENT AND TRADEMARK OFFICE
CERTIFICATE OF CORRECTION

| | | |
|---|---|---|
| PATENT NO. | : 9,637,067 B2 | Page 1 of 1 |
| APPLICATION NO. | : 14/711958 | |
| DATED | : May 2, 2017 | |
| INVENTOR(S) | : Rainer Kohlstrung and Takehito Yamada | |

It is certified that error appears in the above-identified patent and that said Letters Patent is hereby corrected as shown below:

In the Specification

Column 14, Line 46, Table 1 column headings: Change "W1" to -- VV1 --; "W2" to -- VV2 --; "W3" to -- VV3 --; "W4" to -- VV4 --.

Column 15, Line 3, Table 1 column headings: Change "W1" to -- VV1 --; "W2" to -- VV2 --; "W3" to -- VV3 --; "W4" to -- VV4 --.

Column 15, Line 63: Change "W1-W4" to -- VV1-VV4 --.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*